(12) United States Patent
Brennan et al.

(10) Patent No.: US 10,471,992 B2
(45) Date of Patent: Nov. 12, 2019

(54) VEHICLE GUIDANCE SYSTEM

(71) Applicant: VOLVO TRUCK CORPORATION, Göteborg (SE)

(72) Inventors: Sean Nicholas Brennan, Port Matilda, PA (US); James Theodore Dorris, Warren, MI (US)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 15/566,841

(22) PCT Filed: Apr. 15, 2016

(86) PCT No.: PCT/US2016/027828
§ 371 (c)(1),
(2) Date: Oct. 16, 2017

(87) PCT Pub. No.: WO2016/168650
PCT Pub. Date: Oct. 20, 2016

(65) Prior Publication Data
US 2018/0127027 A1 May 10, 2018

Related U.S. Application Data

(60) Provisional application No. 62/148,085, filed on Apr. 15, 2015.

(51) Int. Cl.
*B62D 15/02* (2006.01)
*B62D 13/06* (2006.01)
*G05D 1/02* (2006.01)

(52) U.S. Cl.
CPC ......... *B62D 15/0285* (2013.01); *B62D 13/06* (2013.01); *B62D 15/021* (2013.01);
(Continued)

(58) Field of Classification Search
USPC .......................................................... 701/41
See application file for complete search history.

(56) References Cited

U.S. PATENT DOCUMENTS

| 8,496,078 B2 | 7/2013 | Wellborn et al. |
| 2007/0027581 A1 | 2/2007 | Bauer et al. |

(Continued)

FOREIGN PATENT DOCUMENTS

| DE | 102012016980 A1 | 2/2013 |
| EP | 2949506 A1 | 5/2015 |

(Continued)

OTHER PUBLICATIONS

ISR of corresponding PCT/US2016/027828 dated Jul. 26, 2016.
(Continued)

*Primary Examiner* — Maceeh Anwari
(74) *Attorney, Agent, or Firm* — Withrow & Terranova, PLLC

(57) ABSTRACT

A system and method for guiding an articulated vehicle having at least a first section and a second section includes one or more sensors positioned separately from the vehicle and adapted to detect the positions of and the angle between the first and second sections. The system also may include one or more position sensors located on the vehicle. A computing system that may be on the vehicle or positioned separately from the vehicle receives the position data and includes a pose-determining algorithm for determining the position and orientation of the vehicle and a guidance-determining algorithm for determining guidance commands to guide the vehicle to a target position. A communications device communicates the guidance commands or sensed position and/or angle information to the vehicle.

11 Claims, 10 Drawing Sheets

(52) U.S. Cl.
CPC ......... *B62D 15/028* (2013.01); *G05D 1/0225* (2013.01); *G05D 1/0246* (2013.01); *G05D 2201/0213* (2013.01)

(56) References Cited

U.S. PATENT DOCUMENTS

| | | |
|---|---|---|
| 2008/0053741 A1 | 3/2008 | Forero |
| 2009/0079839 A1 | 3/2009 | Fischer |
| 2011/0001825 A1 | 1/2011 | Hahn |
| 2011/0218670 A1 | 9/2011 | Bell et al. |
| 2013/0037356 A1 | 2/2013 | Andersen et al. |
| 2014/0303849 A1* | 10/2014 | Hafner .................. B62D 13/06 701/42 |

FOREIGN PATENT DOCUMENTS

| | | | |
|---|---|---|---|
| EP | 2949506 A1 * | 12/2015 | ............. B60P 1/045 |
| WO | 2014185828 A1 | 11/2014 | |

OTHER PUBLICATIONS

Written Opinion of corresponding PCT/US2016/027828 dated Jul. 26, 2016.
International Preliminary Report on Patentability of corresponding PCT/US2016/027828 dated Mar. 7, 2018.
European Official Action (dated Dec. 19, 2018) for corresponding European App. 16780870.8.
EESR for Corresponding EPO application, dated Dec. 19, 2018.

* cited by examiner

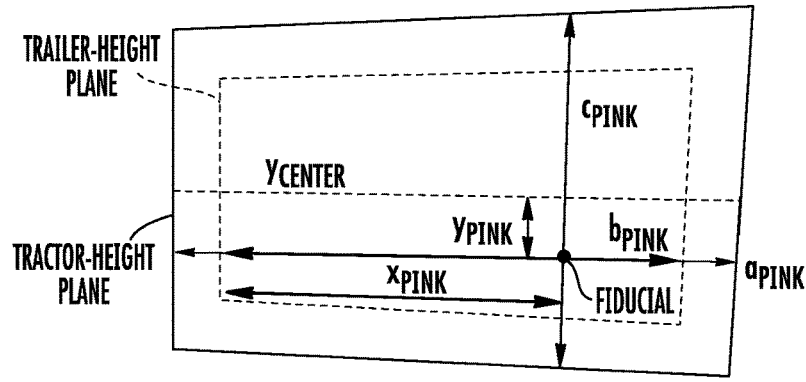
FIG. 7A
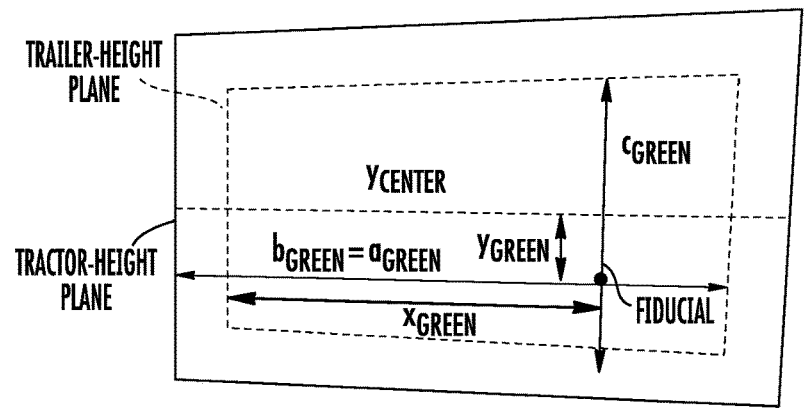
FIG. 7B
| HEIGHT PLANE | IMAGE EDGE | VARIABLE NAME |
|---|---|---|
| TRAILER | TOP | $x_{TOP, TRAIL}$ |
| | BOTTOM | $x_{BOT, TRAIL}$ |
| | LEFT | $x_{L, TRAIL}$ |
| | RIGHT | $x_{R, TRAIL}$ |
| TRACTOR | TOP | $x_{TOP, TRACT}$ |
| | BOTTOM (y-720) | $x_{BOT, TRACT}$ |
| | LEFT (y=0 TO y=720) | $x_{L, TRACT}$ |
| | RIGHT (y=0 TO y=720) | $x_{R, TRACT}$ |
FIG. 7C

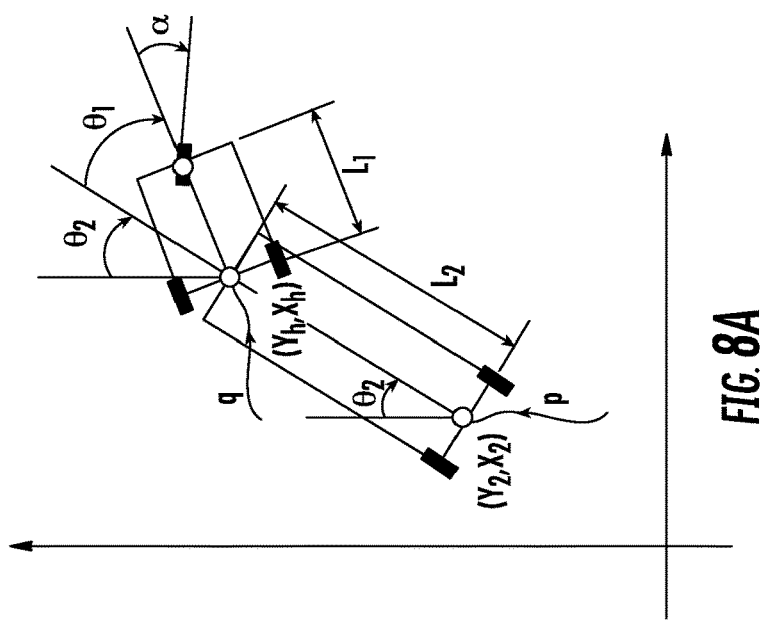

| PARAMETER | DEFINITION |
|---|---|
| $L_1$ | DISTANCE BETWEEN TRACTOR FRONT AXLE AND HITCH POINT |
| $L_2$ | DISTANCE BETWEEN HITCH POINT AND TRAILER REAR AXLE |
| $x_2$ | x-COORDINATE OF TRAILER REAR AXLE CENTER |
| $y_2$ | y-COORDINATE OF TRAILER REAR AXLE CENTER |
| $x_h$ | x-COORDINATE OF HITCH POINT |
| $y_h$ | y-COORDINATE OF HITCH POINT |
| $\theta_1$ | ORIENTATION OF TRACTOR RELATIVE TO TRAILER ORIENTATION |
| $\theta_2$ | ORIENTATION OF TRAILER RELATIVE TO PATH |
| $\alpha$ | TRACTOR STEERING ANGLE |
| $p$ | DISTANCE TRAVELED BY THE TRAILER REAR AXLE CENTER |
| $q$ | DISTANCE TRAVELED BY THE TRACTOR REAR AXLE CENTER |

VEHICLE GUIDANCE SYSTEM

FIELD

The disclosed embodiments are generally directed to vehicle guidance systems and more particularly to systems for guiding articulated vehicles.

BACKGROUND

Articulated vehicles, such as tractor-trailer trucks, are very difficult to maneuver, particularly when it is desired to load or unload them such as at a loading dock. Docking the articulated vehicle involves maneuvering the vehicle in a rearward direction such that the back of the vehicle is positioned within inches of and parallel to a front of the loading dock.

Existing automated systems for guiding vehicles rely on sensors and equipment that are located on the vehicle. Other systems utilize a model-free (e.g., a fuzzy logic) control approach, and are designed for passenger vehicles (e.g., non-articulated vehicles), or are designed for path-following instead of parking-like maneuvers. Such path-following systems typically generate a reference path, calculate steering corrections and then implement these corrections to cause motion toward the path. These systems are not suitable for guiding articulated vehicles in parking-like or docking maneuvers.

SUMMARY

According to one embodiment, a system for guiding an articulated vehicle having at least a first section and a second section connected at a first articulation point is disclosed. The system includes at least a first sensor positioned separately from the vehicle and adapted to detect at least one of a position and a relative angle of the first and second sections, a computing system having the ability to process and transmit sensor information for a pose-determining algorithm and a guidance-determining algorithm, and a communication device.

According to another embodiment, a method of guiding an articulated vehicle having at least a first section and a second section connected at an articulation point is disclosed. The method includes sensing at least one of a position and a relative angle of the first and second sections with at least a first sensor positioned separately from the vehicle, transmitting the at least one of the position and the relative angle of the first and second sections to a computing system, determining the pose of the vehicle, determining guidance commands for the vehicle, and communicating the guidance commands.

It should be appreciated that the foregoing concepts, and additional concepts discussed below, may be arranged in any suitable combination, as the present disclosure is not limited in this respect.

The foregoing and other aspects, embodiments, and features of the present teachings can be more fully understood from the following description in conjunction with the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 7a is a schematic representation of variables relevant to a vehicle guidance system for a vehicle according to one embodiment;

FIG. 7b is a schematic representation of additional variables relevant to the vehicle guidance system of FIG. 7a;

FIG. 7c is a table showing variables used to determine the pose of the vehicle of FIG. 7a;

FIG. 8a is a schematic top view of an articulated vehicle according to one embodiment;

FIG. 8b is a table showing variables used to describe a state of the vehicle of FIG. 8a for determining guidance commands;

DETAILED DESCRIPTION OF INVENTION

Figure 1:
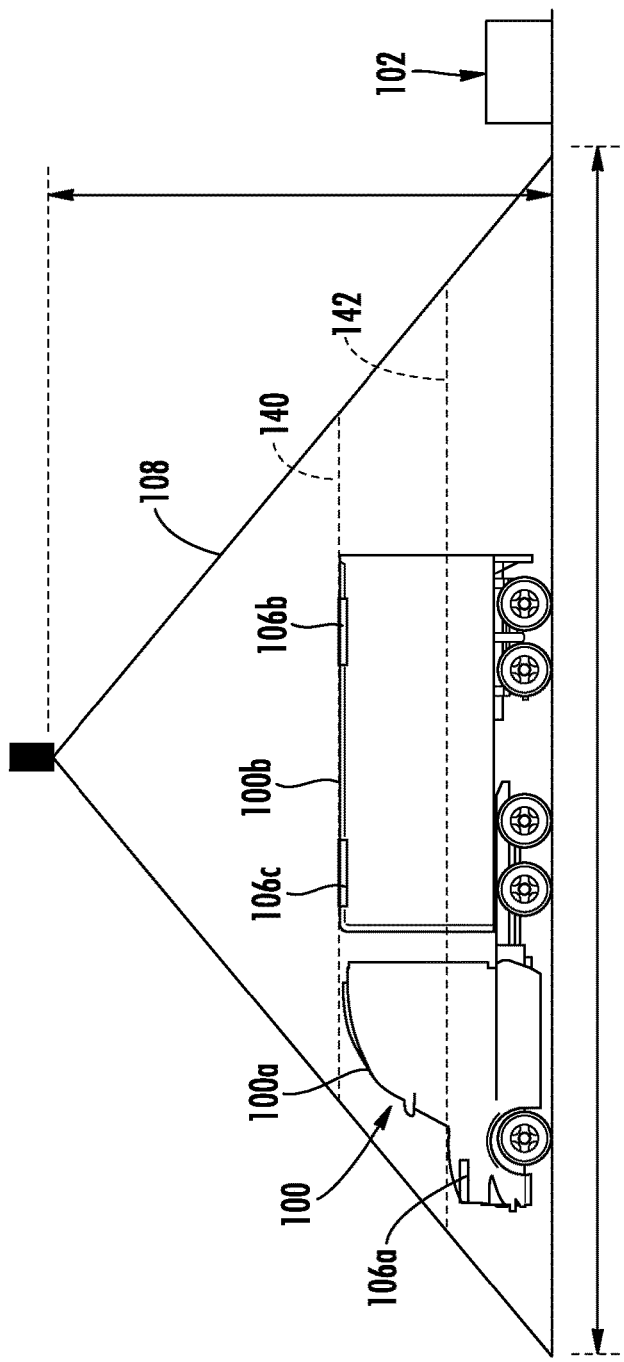
FIG. 1 is a schematic side view of an articulated vehicle being docked at a loading dock according to one embodiment.

Articulated vehicles are required to be maneuvered, such as for docking at a loading dock, storing in a garage, and/or parking. Articulated vehicles typically include a cab and one or more trailers. For purposes of illustration, an articulated vehicle having a first vehicle section, the cab, and a second vehicle section, the trailer, will be described herein. As will be appreciated, the articulated vehicle may include vehicles other than a tractor-trailer, such as a passenger vehicle with an attached trailer, and may have more than two vehicle sections (e.g., two or more trailers). For illustrative purposes, the articulated vehicle will be described as being docked at a loading dock.

Articulated vehicles are difficult to dock. In some embodiments, the second vehicle section is of different lengths, and a driver must judge the position of the different-sized second vehicle sections relative to the loading dock. It also may be difficult or even impossible for the driver to see the back of the second vehicle section in configurations in which an angle between the first vehicle section and the second vehicle section is large. Further, the relationship between the steering of the first vehicle section and the position of the second vehicle section may not be intuitive to the driver.

Some known automated docking systems rely on vehicle-mounted detection and processing, are designed for passenger vehicles, utilize manually chosen commands, are used to maneuver a vehicle in a forward direction, and/or utilize a model-free control approach (e.g., a fuzzy logic approach). Such systems may not be suitable for the automated guiding of articulated vehicles of a diversity of configurations as they do not take into account the multiple vehicle sections, the differences in vehicle geometry caused by various dimensions in the first and/or second vehicle section, and/or the fact that the first vehicle section articulates with respect to the second vehicle portion. Some of these systems also fail to consider the relative orientation between the vehicle sections of the articulated vehicle.

A solution to guiding an articulated vehicle, in at least a rearward direction, is disclosed herein and includes a vehicle guiding system, such as an infrastructure-based system, having sensing and computing equipment and a model-based control approach for guiding the vehicle. According to one aspect, the system is configured to sense the pose of each vehicle section, calculate guidance commands for the vehicle, and communicate those commands to the vehicle. In some embodiments, the system includes a sensing system, a pose-determining algorithm, a guidance-determining algorithm, and communication and processing hardware.

For purposes herein, a "pose" of the articulated vehicle includes the position and orientation of a first vehicle section with respect to the position and orientation of a second vehicle section. As shown in FIG. 8a, in one example, the pose may include pose parameters $x_2$, $y_2$, $\theta_1$, and $\theta_2$ As illustrated in FIGS. 8a and 8b, the pose parameter $x_2$ corresponds to the x-coordinate of the trailer rear axle center, $y_2$ corresponds to the y-coordinate of the trailer rear axle center, $\theta_1$ corresponds to the orientation of the first vehicle section orientation relative to the second vehicle section orientation, and $\theta_2$ corresponds to the orientation of the trailer relative to the path. In some embodiments, without loss of applicability of these results, one can derive one and sometimes more of these coordinates from the others, if the vehicle's geometric lengths are known.

In one aspect, the sensing and computing system may be positioned in a stationary location, not in the vehicle. That is, sensing and computing equipment is installed at a fixed location such as the docking area, separately from the vehicle. In such embodiments, because the vehicle does not include any installed sensing and computing equipment, minimal additional time, money and effort is expended to maneuver additional vehicles toward the loading dock. For example, having a stationary system may mean a lighter computing effort than with a vehicle-mounted system, because the location of fixed objects in the vehicle's environment (e.g., in a docking area) are known independently of the vehicle and can be taken into account either in a pre-processing step or for online processing. Additionally, such a stationary system may mean easier accessibility or upgradability relative to a vehicle-mounted system, since a small set of sensors may serve a large number of vehicles. Such a system also may have less accidental damage as a stationary system would not be exposed to new and different roadway conditions, or could incorporate special protection that is not practical on a vehicle. The model-based control approach also may be used to provide commands to assist a driver in docking the articulated vehicle at a loading dock, for many different vehicle configurations. Such a system may be integrated with numerous types of detection, planning and drive systems.

In another aspect, the sensing system is positioned in a stationary location, not on the vehicle, with at least some or all of the computing system being installed on the vehicle itself. In such an embodiment, the sensing system transfers information (e.g., camera feed) to the vehicle where it is processed using the computing system. Guidance commands are thereafter transferred to the driver.

In some embodiments, the sensing system includes one or more sensors to sense the characteristics of the vehicle in its surrounding environment. In such embodiments, the sensor(s) may capture two or more vehicle measurements. For example, each of the sensors may detect the position and relative or global angle of the first vehicle section and/or the position and relative or global angle of the second vehicle section. That is, the sensor(s) may detect characteristics of the first and second vehicle sections used to determine the pose parameters. In some embodiments, only some of these measurements need be detected by the sensors as a subset of measurements may be calculated from vehicle dimensions. The sensors may include one or more of a camera, a global positioning system (GPS), a light detection and ranging (LiDAR) unit or a radar unit. Other suitable sensors (e.g., sonar, infrared (IR) proximity sensors, and a compass) also may be used.

The sensors may be mounted at a fixed location in the vehicle's environment, for example on a ceiling or on the loading dock, separate from the vehicle. Each sensor may have a fixed rotation or may be swiveled as necessary to view the vehicle. The sensors may be positioned above the vehicle, to the left and right of the vehicle, behind and to a side (e.g., to the right side) of the vehicle, or behind and in front of the vehicle. As will be appreciated, the sensors also may be positioned in other suitable locations. In these embodiments, the sensors are positioned such that each of the first and second vehicle sections are sufficiently visible from the mounted sensors to infer key information about position or orientation.

According to yet another aspect, the sensing system may include one or more sensors mounted at a stationary location, not on the vehicle, and one or more sensors mounted on the vehicle. In this aspect, the computing system may be installed on the vehicle itself, in whole or in part, and/or at a stationary location, in whole or in part. The sensing system may include a first stationary sensor and a second sensor positioned on the vehicle. As will be appreciated the vehicle sensor may be located on one of the vehicle sections (e.g., the first or second vehicle section). In such embodiments, the vehicle sensor may determine relative position and/or orientation of the system to either augment the measurements of the stationary sensor with missing information or supplement the measurements of the stationary sensor with duplicative measurements to allow averaging or fusion of the data to increase accuracy.

In embodiments that include both vehicle sensors and stationary sensors, the vehicle and stationary sensors may include one or more of a camera, a global positioning system (GPS), a light detection and ranging (LiDAR) unit or a radar unit. Other suitable sensors (e.g., sonar, infrared (IR) proximity sensors, and a compass) also may be used. The stationary sensors and the vehicle sensors may be the same (e.g., both cameras) in some embodiments, while in other embodiments, the stationary sensor and vehicle sensor may be different.

In some embodiments, data is collected from the sensor(s) and is transmitted to a computer where a pose-determining algorithm processes the data to determine the pose of the vehicle sections (e.g., the pose parameters). A guidance-determining algorithm then uses the pose information, along with a target vehicle trajectory and vehicle section dimensions, to calculate commands for guiding the vehicle. The commands are based on the difference between the current vehicle pose and desired trajectory. The guidance commands are communicated to the vehicle via communication devices located at a processing location and on the vehicle. In some embodiments, the commands are wirelessly transmitted to the vehicle. In such embodiments, using a wireless connection allows the same processing system to be connected to multiple vehicles. Such commands may be conveyed to a driver, a semi-autonomous driver assistance system, or to a completely autonomous driving system. Once conveyed to the vehicle, the commands can be used according to a vehicle system to include either warnings, driver throttle inputs, driver brake inputs, driver steering inputs, and/or a combination thereof.

The guidance-determining algorithm is based on the kinematics of the articulated vehicle and calculates how the steered vehicle section (such as the cab of the tractor-trailer or a steered trailer) should be guided in order for the vehicle to align with the target trajectory. For example, the guidance commands may be based on a steering angle or a velocity to be used by the articulated vehicle. For articulated vehicles, the target trajectory may include a path defined for the second vehicle section (e.g., the trailer) so that the second vehicle section is aligned with the platform for loading and unloading. Current pose information may be continuously provided by the pose-determining algorithm and may be used in conjunction with the target trajectory, vehicle dimensions, and a desired velocity to continuously calculate desired steering and velocity commands.

The system may be configured to interface with a variety of different systems, including sensing, planning and driving systems. For example, since the system uses a target trajectory, a path planner that generates such a trajectory also may be incorporated into the system. In such an embodiment, the path planner may generate a path based on the current pose and target pose information. The target trajectory also may be provided by external means.

In some embodiments, a default target trajectory may be generated to include a pre-specified path type that extends outward from the target position. In one embodiment, the vehicle is guided along a pre-specified straight-line path that extends along a longitudinal axis of the target vehicle orientation. The sensing or computation system also may include limits on the feasible starting points of a trajectory that ensure adequate docking and/or avoidance of fixed or movable obstacles in the vehicle's vicinity.

Figure 9:
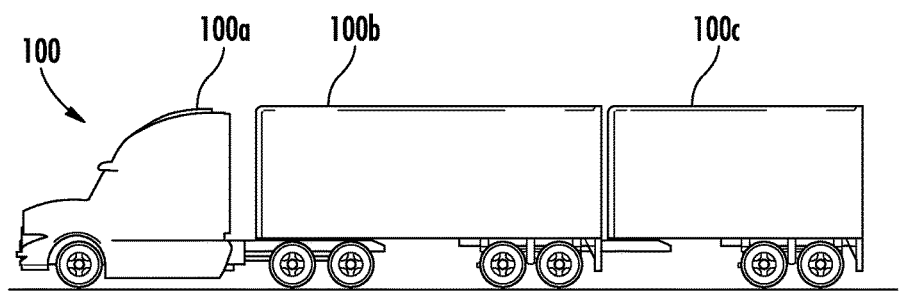
FIG. 9 is a schematic side view of an articulated vehicle according to one embodiment.

For purposes of illustration, FIG. 1 shows an articulated vehicle, tractor-trailer 100, having a first vehicle section 100a such as a cab and a second vehicle portion 100b such as a trailer. Although the tractor-trailer 100 is shown as having only a single trailer 100b, the second vehicle section, the tractor-trailer may have more than one trailer (e.g., third, fourth, fifth, etc. vehicle sections), in some embodiments. That is, the tractor-trailer has a first vehicle section and subsequent vehicle sections. For example, as shown in FIG. 9, the tractor-trailer 100 has first, second and third vehicle sections 100a, 100b, 100c corresponding to the cab, first trailer, and second trailer, respectively.

In the example shown in FIG. 1, the vehicle is being docked at a loading dock 102 via the guidance system, although the system may be used to guide the vehicle into other environments (e.g., a parking hanger, a parking spot, or a similar final position of the vehicle). In this embodiment, the sensing system is a camera 104, and the camera 104 is positioned above and facing downwardly towards the tractor-trailer 100. For example, in one embodiment, the camera 104 may be mounted to a ceiling in the loading dock area. In such an embodiment, the camera 104 is positioned high enough above the tractor-trailer 100 so that the camera can continuously obtain images of the environment below it (e.g., the docking area) as the vehicle moves. That is, the camera is positioned such that images of the cab and of the trailer may be obtained. As shown in FIG. 1, the camera 104 has a field of view 108 (e.g., a sensing area) in which the tractor-trailer passes while moving towards the loading dock 102 and in which the camera 104 may detect the tractor-trailer 100. In some embodiments, as is shown, the loading dock 102 is positioned just outside of the field of view 108 of the camera 104 to illustrate that the loading dock or final location of the vehicle does not have to be in the view of the infrastructure-based sensors. As will be appreciated, the loading dock also may be positioned within the field of view of the camera or in another suitable location.

Although a single camera is shown in this embodiment, in other embodiments, the sensing system includes more than one camera. In such embodiments, as with other embodiments, the cameras may be positioned on either side of the tractor-trailer, in front and behind the tractor-trailer, or behind and to the side of the tractor-trailer. The additional camera also may be installed on the vehicle.

Although the sensing system is shown in FIG. 1 as being a camera, in other embodiments, other sensors may be used to detect the articulated vehicle. For example, the sensing system may include a global positioning system (GPS) on the vehicle working in concert with an orientation measurement, a light detection and ranging (LiDAR) unit mounted such that the side profile of the vehicle is measured to obtain each unit's position and angle, or a radar unit mounted over or to the side of the vehicle. The sensing system also may include combinations of these sensors.

Figure 3:
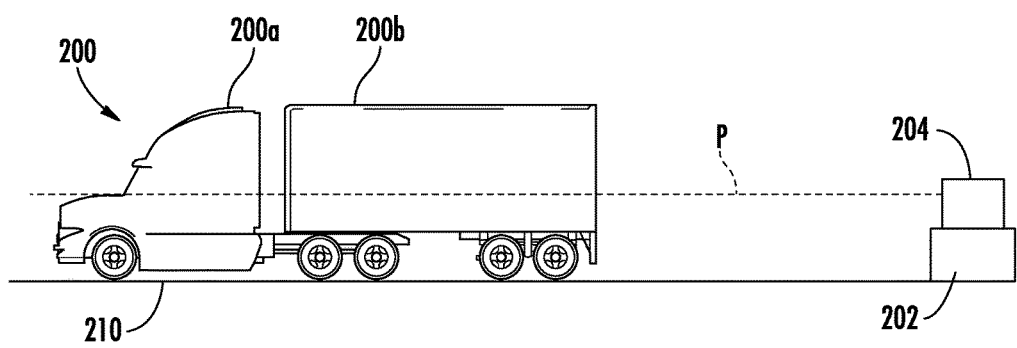
FIG. 3 is a schematic side view of an articulated vehicle being docked according to another embodiment.

FIG. 3 illustrates a system with a LiDAR unit for detecting the articulated vehicle, tractor-trailer 200. As shown in this figure, the LiDAR unit 204 may be positioned at an edge of the docking area, such as on the loading dock 202. In one embodiment, the LiDAR unit 204 scans a plane parallel to a floor 210 (see the line labeled P) and is positioned high enough in the docking area so that it can detect both first and second vehicle sections, cab 200a and trailer 200b, respectively. Although only one LiDAR unit is shown in this figure, in other embodiments more than one LiDAR unit may be used. Additionally, other sensors (e.g., a GPS) also may be employed to avoid the need to sense all of the vehicle sections with the LiDAR unit. In some embodiments, at least one of the other sensors may be positioned on the vehicle. The LiDAR unit(s) also may be positioned in other suitable locations in other embodiments. For example, the LiDAR unit may be positioned above the articulated vehicle or to the sides. In systems using a LiDAR unit, the data received from the LiDAR unit is filtered and divided into segments. Processing occurs on those segments to identify what each segment represents, and then the important vehicle parameters based upon that information are calculated.

The data from the sensors (e.g., camera 104) is transmitted to a computer where a pose-determining algorithm uses the data to determine the pose of the vehicle (e.g., positions and angles of vehicle sections). In some embodiments, the vehicle has three fiducial markers, which, in some embodiments are three differently colored markers that are located at specific points on the articulated vehicle to detect the pose of the vehicle. In one embodiment, the fiducial markers may be positioned at the front axle center of the first vehicle section, at an articulation point, and at a rear axle center of the second vehicle section. The relative positions of the fiducial markers may be determined as the articulated vehicle and, thus the markers, move across the docking area in a manner that allows the determination of vehicle pose from the mounted sensors working alone or in concert with sensors that may be on the vehicle sections.

Figure 2:
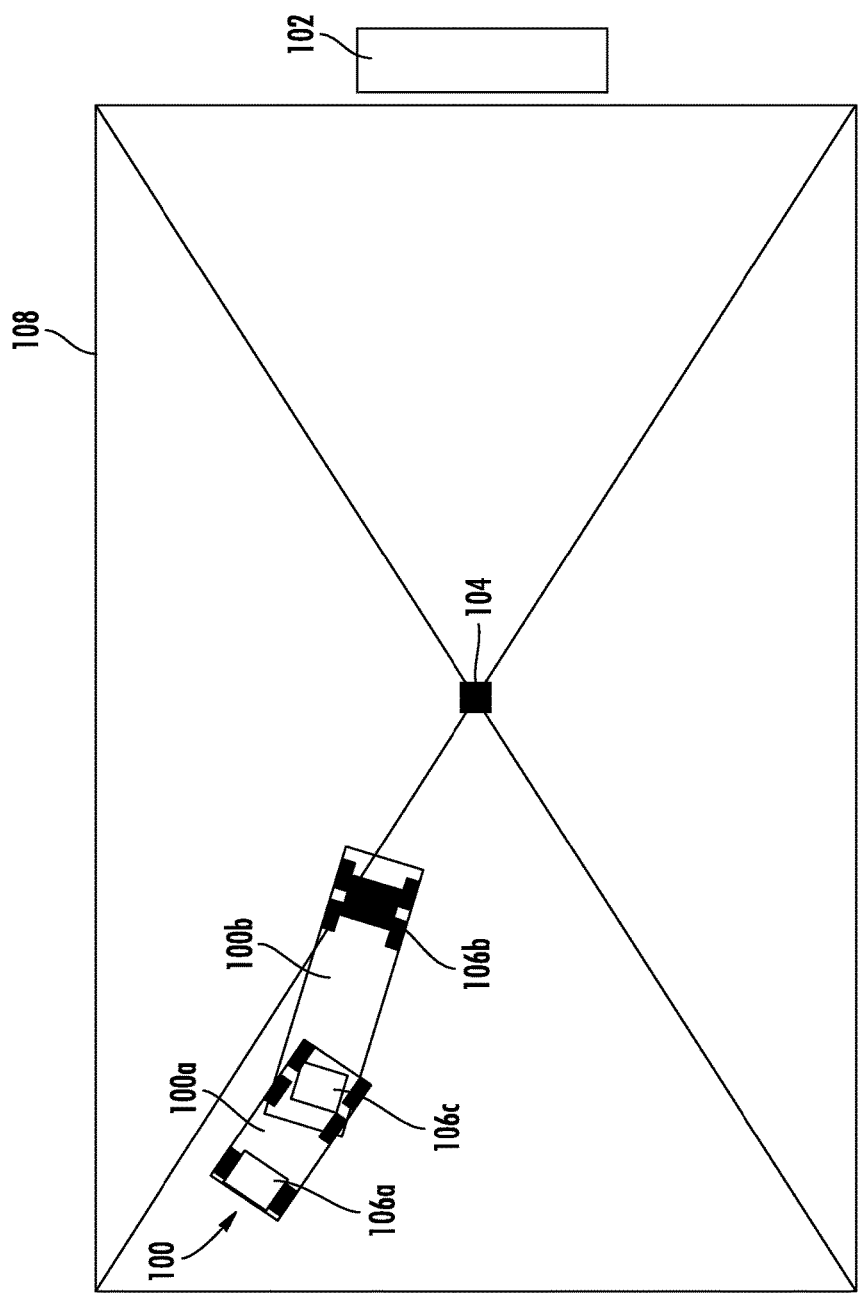
FIG. 2 is a schematic top view of the vehicle being docked in FIG. 1.

As shown in FIGS. 1 and 2, embodiments in which the articulated vehicle is a tractor-trailer, the first fiducial marker 106a is located at the front axle center of the tractor, the second fiducial marker 106b is located at the rear axle center of the trailer, and the third fiducial marker 106c is located at a hitch point. In one embodiment, the first fiducial marker 106a may be a pink marker, the second fiducial marker 106b may be blue marker, and the third fiducial marker 106c may be a green marker, although other suitable colors, patterns or shapes may be used.

In use, and in one embodiment, the pose-determining algorithm identifies the positions of the colored markers in the image data sent to the computer and determines the position and orientation (e.g., the angle from an overhead view) of the first and second vehicle sections accordingly. That is, pixel locations of the markers are acquired and the locations of the markers within the docking environment are determined. In some embodiments, once the pixel locations of the markers have been acquired, the locations within the global environment are determined. This may involve extrinsically calibrating the camera such that variations in the image dimensions are accounted for. For example, depending on how the camera lens is mounted relative to the floor, the physical distances spanned by the top and left edges of the image may not be exactly the same as the distances spanned by the bottom and right edges, respectively. In one embodiment, to perform camera calibration, the distance coordinates of each of the markers are determined by measurement with a different sensor. In some embodiments, to address the variation in image dimensions, the height and width dimensions of the image are assumed to vary linearly from one edge to the other.

Figure 6:
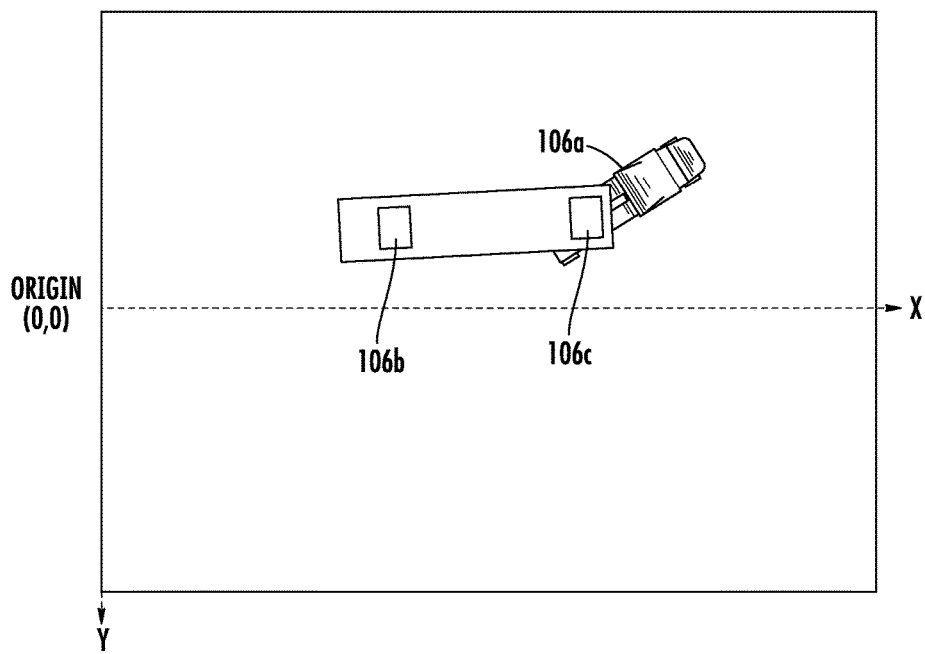
FIG. 6 is a top view of an articulated vehicle in a docking region according to an embodiment.

For purposes of illustration, an example of the pose-determining algorithm being applied to a tractor-trailer in the camera-based embodiment will be described. The coordinate frame used to determine distance coordinates of the fiducial markers is shown in FIG. 6, with the origin located at the left edge of the image, at the dock, the x-axis extending horizontally through the middle of the image, and the positive y-axis extending vertically downwardly in the image.

First, the distance coordinates of the pink or tractor fiducial marker are calculated using the variables shown and described in FIGS. 7a and 7c. In this embodiment, the height of the image in the tractor-height plane (see the line labeled 142 in FIG. 1), $c_{pink}$, may be found via linear interpolation using the horizontal pixel coordinate of the pink tractor fiducial marker ($x_{pink,pix}$):

$$c_{pink}(m) = \left(\frac{x_{pink,pix}}{1024}\right) * (y_{R,tract} - y_{L,tract}) + y_{L,tract}$$

The width of the image in the tractor-height plane, $a_{pink}$, may also be found via interpolation with the vertical pixel coordinate of the pink tractor fiducial marker ($y_{pink,pix}$):

$$a_{pink}(m) = \left(\frac{y_{pink,pix}}{720}\right) * (x_{bot,tract} - x_{top,tract}) + x_{top,tract}$$

It also may be desired to know the location of the pink tractor fiducial marker in the trailer-height plane. To convert from the tractor-height plane to the trailer-height plane, the width of the trailer-height plane at this pixel location may be calculated:

$$b_{pink}(m) = \left(\frac{y_{pink,pix}}{768}\right) * (x_{bot,trail} - x_{top,trail}) + x_{top,trail}$$

Using the distances calculated above ($c_{pink}$, $a_{pink}$, and $b_{pink}$) along with the pixel coordinates of the pink marker ($x_{pink,pix}$ and $y_{pink,pix}$) and the pixel coordinates of the center of the image ($x_{center,pix}$=512, $y_{center,pix}$=384), the distance coordinates of the pink fiducial marker 106a in the trailer-height plane may be calculated in this embodiment as:

$$x_{pink}(m) = \left(\frac{x_{pink,pix} - x_{center,pix}}{1024 \text{ pixels}}\right) * a_{pink} + \frac{b_{pink}}{2}$$

$$y_{pink}(m) = \left(\frac{y_{pink,pix} - y_{center,pix}}{720 \text{ pixels}}\right) * c_{pink}$$

Similar calculations may be performed to determine the distance coordinates for the green hitch point fiducial marker 106c from its pixel coordinates ($x_{green,pix}$, $y_{green,pix}$). FIGS. 7b and 7c illustrate the important variables for these calculations. First, the height and width of the image in the trailer-height plane may be calculated:

$$c_{green}(m) = \left(\frac{x_{green,pix}}{1024}\right) * (y_{R,trail} - y_{L,trail}) + y_{L,trail}$$

$$a_{green}(m) = \left(\frac{y_{green,pix}}{720}\right) * (x_{bot,trail} - x_{top,trail}) + x_{top,trail}$$

Since the green hitch point fiducial marker is in the trailer-height plane (see line 140 in FIG. 1), its coordinates may not need to be converted to a different plane. Thus, $b_{green}$ is the same as $a_{green}$, and in this embodiment the distance coordinates for the green fiducial marker may be calculated as follows:

$$x_{green}(m) = \left(\frac{x_{green,pix} - x_{center,pix}}{1024}\right) * a_{green} + \frac{a_{green}}{2}$$

$$y_{green}(m) = \left(\frac{y_{green,pix} - y_{center,pix}}{720}\right) * c_{green}$$

The distance coordinates for the blue trailer fiducial marker ($x_{blue}$, $y_{blue}$) may be calculated with the same equations as those used to calculate the distance coordinates of the green hitch point fiducial marker by using ($x_{blue,pix}$ and $y_{blue,pix}$) instead of ($x_{green,pix}$, $y_{green,pix}$).

A summary of the edge variables used in the above-described equations can be found in the table shown in FIG. 7c.

Once the distance coordinates of the markers are known in the same plane (the trailer-height plane), the angles of the lines connecting the markers are calculated. This is done in this embodiment by dividing the differences in the y-coordinates by the differences in the x-coordinates and taking the inverse tangent.

$$\text{tractor angle (degrees)} = \tan^{-1}\left(\frac{y_{green} - y_{pink}}{x_{pink} - x_{green}}\right)$$

$$\text{trailer angle (degrees)} = \tan^{-1}\left(\frac{y_{blue} - y_{green}}{x_{green} - x_{blue}}\right)$$

Figure 5:
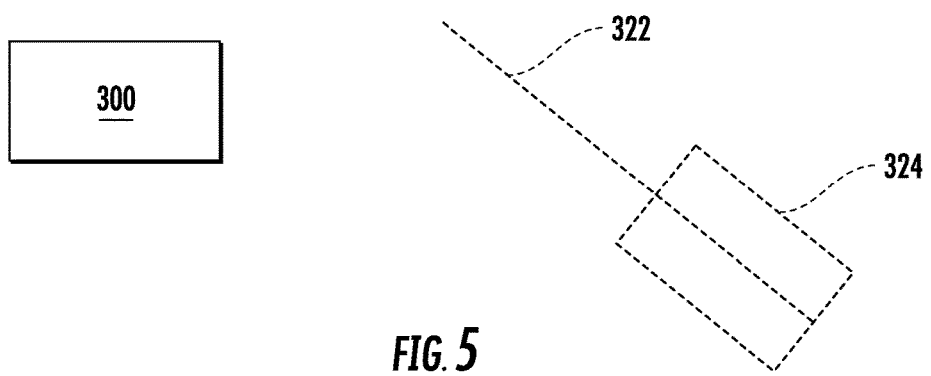
FIG. 5 is a schematic representation of a path and target position of a vehicle according to one embodiment.

The guidance-determining algorithm processes the pose calculated by the pose-determining algorithm and determines guidance commands. The guidance-determining algorithm, also known as the control algorithm, may rely on knowing the lateral deviation of the trailer rear axle center from a straight path (see the straight-line path 322 in FIG. 5), $y_2$, the orientation of the trailer relative to the straight path, $\theta_2$, and the orientation of the tractor relative to the trailer's orientation, $\theta_1$. Thus, it is important for the sensing system to obtain these values. The orientation of the trailer, $\theta_2$, may be directly calculated from the trailer angle (see FIG. 8a):

$$\theta_2 \text{ (degrees)} = 360° - \text{trailer angle}$$

The orientation of the tractor, $\theta_1$ (see FIG. 8a), may be calculated from the tractor angle and $\theta_2$:

$$\theta_2 \text{ (degrees)} = 360 - \text{tractor angle} - \theta_2$$

Depending on which coordinate frame is used, the trailer angle and tractor angle may be adjusted before calculating $\theta_2$ and $\theta_1$ in order to reflect the desired coordinate frame. For example, if the trailer angle is less than 180°, 360° may be added to it before calculating $\theta_2$. The same may be done with the tractor angle.

The important variables used in this embodiment of the kinematic model to determine guidance commands are: distance parallel to the path ($x_2$), lateral deviation of the trailer rear axle center from the path ($y_2$), orientation of the trailer relative to the path ($\theta_2$), and orientation of the tractor relative to the trailer's orientation ($\theta_1$) (see FIGS. 8a and 8b). Important constants are $L_1$, the length between the tractor front axle and the hitch point, and $L_2$, the length between the hitch point and the center of the trailer rear axle (see FIGS. 8a and 8b). The kinematic model and its parameters are shown in FIG. 8a and defined in the table shown in FIG. 8b.

To determine the steering angle, $\alpha$ (See FIG. 8a), that corresponds to the pose parameter values ($\theta_1$, $\theta_2$, and $y_2$), any number of existing steering algorithms can be used. In this embodiment, the following equation, from Sampei et al. (1991), is used:

$$\alpha = \tan^{-1}\left[-L_1 L_2 \cos^3\theta_1 \cos^4\theta_2 \rho + \frac{(\tan\theta_1 - 3\sin^2\theta_1 \tan\theta_2) \cdot L_1 \cos\theta_1}{L_2}\right].$$

In this equation, the control effort, $\rho$, is determined by applying gains ($f_1$, $f_2$, and $f_3$) to the state-variables ($\mu_1$, $\mu_2$, and $\mu_3$), which are transformations of the vehicle position and angle measurements. In this embodiment, the steering input is obtained by adding corrections together according to the following equations:

$$\rho = f_1 \cdot \mu_1 + f_2 \cdot \mu_2 + f_3 \cdot \mu_2$$

$$\mu_1 = \sigma_1 = y_2$$

$$\mu_2 = -\sigma_2 = -\tan\theta_2$$

$$\mu_3 = \sigma_3 = \frac{\tan\theta_1}{L_2 \cos^3\theta_2}$$

By manipulating the gains $f_1$, $f_2$, and $f_3$ in this equation, different values of $\rho$ can be calculated with the same set of $y_2$, $\theta_1$, and $\theta_2$ values. Thus, manipulating the gains indirectly affects how the tractor-trailer is steered.

In some embodiments, a velocity command for the truck is also determined and communicated to the truck. As with steering, there are many existing algorithms that may be used.

Figure 4:
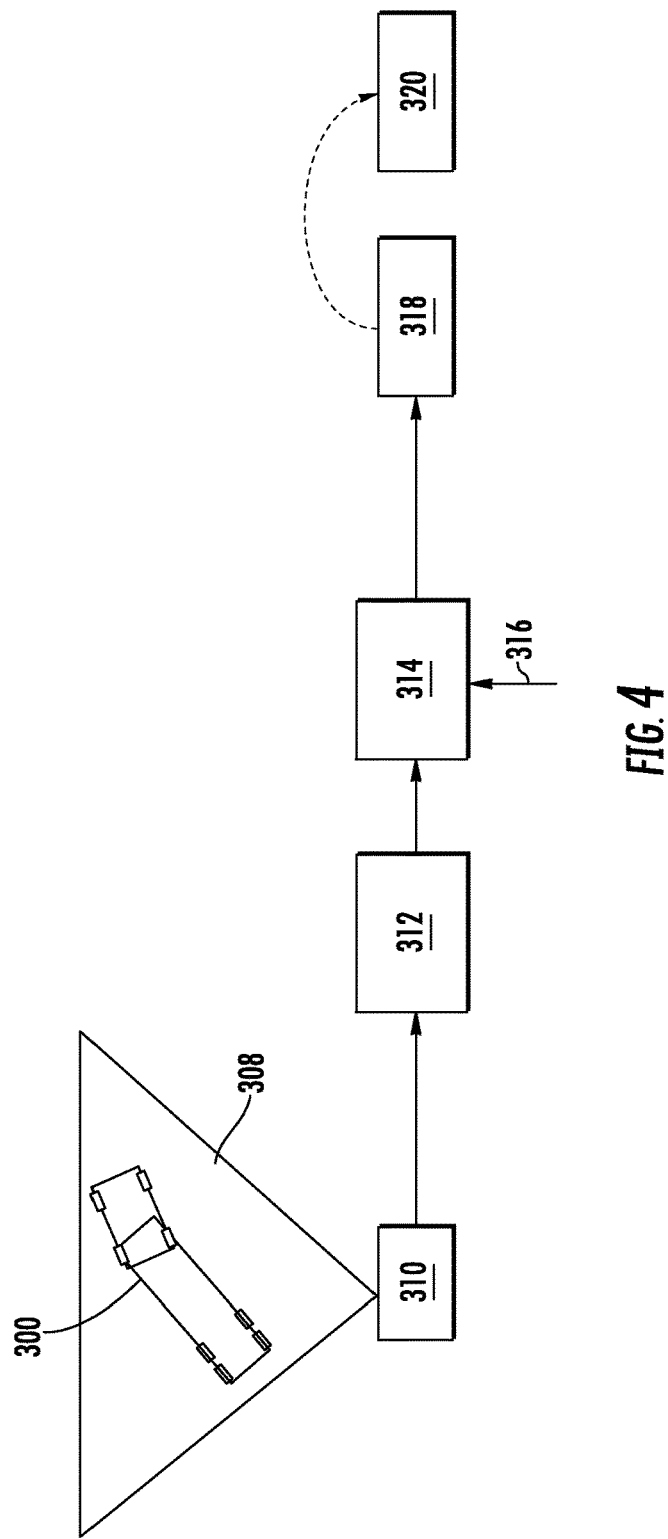
FIG. 4 is a flow chart showing operation of a vehicle guidance system for an articulated vehicle according to one embodiment.

According to another aspect, a method of guiding an articulated vehicle is disclosed. As shown in FIG. 4, the method includes detecting an articulated vehicle 300 in its surrounding environment using a sensing system 310. The sensing system 310 may include sensors (e.g., cameras, radar, sonar, proximity, and/or LIDAR units) that detect the vehicle 300, and particularly the first and second vehicle sections, in a sensing area 308. In some embodiments, the sensing system 310 is all, or at least partly, positioned separately from the vehicle. The method further includes sending data from the sensing system to a computer where a pose-determining algorithm 312 processes the data from the sensing system to determine the pose of the vehicle. The computer may be located separate from the vehicle. The pose is processed by a guidance determining algorithm 314, along with a target (e.g., path) trajectory 316, to calculate guidance commands. In some embodiments, the guidance commands are based on the current vehicle pose and the desired vehicle trajectory. See, for example, FIG. 5, which shows a straight line path 322 and goal position and orientation 324 for the vehicle 300.

The guidance commands are then communicated to the vehicle as suggestions, warnings, or direct commands. In some embodiments, the commands are communicated via a wireless transmitter 318 that transmits the commands to a wireless receiver 320 on the vehicle. The commands may be communicated to a driver, a semi-autonomous driver assistance system, or a completely autonomous driving system.

In some embodiments, the commands are based on a desired steering angle and a velocity, and communication of those commands includes converting the desired steering angle into a command for steering the motor and transmitting that command, along with a specified velocity command, to the appropriate motors (e.g., a DC motor) of the first vehicle section (e.g., the cab). In some embodiments the method involves adjusting the speed that the vehicle is travelling. In other embodiments, the method involves adjusting the angle that the first vehicle section is moving with respect to the second vehicle section. With these commands, the articulated vehicle is guided while travelling in a rearward direction toward the loading dock until it is properly docked.

As will be appreciated, although the guidance system is shown and described as guiding an articulated vehicle into a docking area, the system may be used to guide the articulated vehicle into other locations, e.g., a storage hanger, a garage or a parking space or around both moving or static obstacles. As will further be appreciated, although the articulated vehicle is shown as being a tractor-trailer, other articulated vehicles may be guided via the system. For example, a passenger vehicle with an attached trailer may be guided using the system.

In all embodiments, the guidance system utilizes at least some or even all of the measurements of the vehicle or vehicle segments from an infrastructure-based sensing system.

Figure 10:
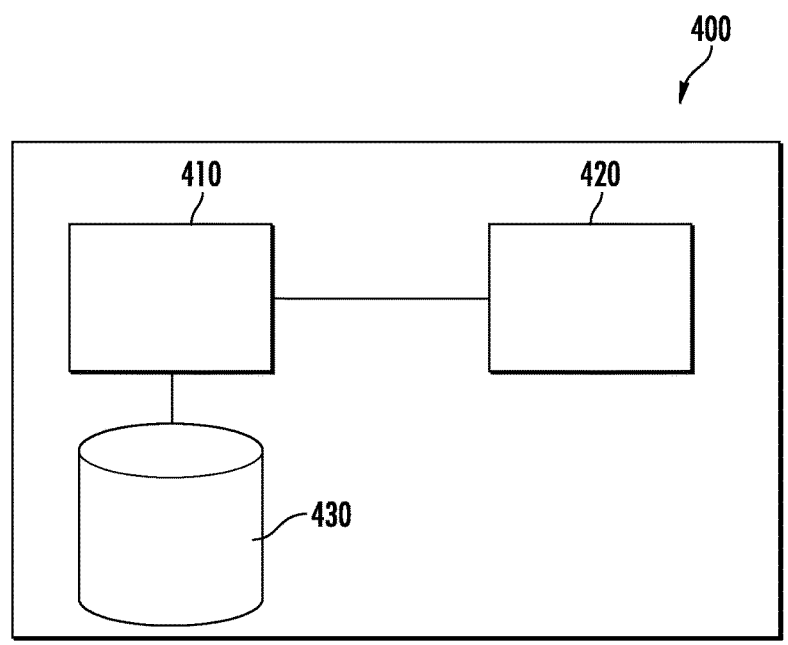
FIG. 10 is a diagram of a computer system according to one embodiment.

An illustrative implementation of a computer system 400 that may be used in connection with some embodiments of the present invention is shown in FIG. 10. One or more computer systems such as computer system 400 may be used to implement any of the functionality described above. The computer system 400 may include one or more processors 410 (e.g., processing circuits) and one or more computer-readable storage media (i.e., tangible, non-transitory computer-readable media), e.g., volatile storage 420 (e.g., memory) and one or more non-volatile storage media 430, which may be formed of any suitable non-volatile data storage media. The processor(s) 410 may control writing data to and reading data from the volatile storage 420 and/or the non-volatile storage device 430 in any suitable manner, as aspects of the present invention are not limited in this respect. To perform any of the functionality described herein, processor(s) 410 may execute one or more instructions stored in one or more computer-readable storage media (e.g., volatile storage 420), which may serve as tangible, non-transitory computer-readable media storing instructions for execution by the processor 410.

The above-described embodiments of the present invention can be implemented in any of numerous ways. For example, the embodiments may be implemented using hardware, software or a combination thereof. When implemented in software, the software code (e.g., instructions) can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of embodiments of the present invention comprises at least one computer-readable storage medium (i.e., at least one tangible, non-transitory computer-readable medium, e.g., a computer memory, a floppy disk, a compact disk, a magnetic tape, or other tangible, non-transitory computer-readable medium) encoded with a computer program (i.e., a plurality of instructions), which, when executed on one or more processors, performs above-discussed functions of embodiments of the present invention. The computer-readable storage medium can be transportable such that the program stored thereon can be loaded or transmitted onto any computer resource to implement aspects of the present invention discussed herein. In addition, it should be appreciated that the reference to a computer program which, when executed, performs above-discussed functions, is not limited to an application program running on a host computer. Rather, the term "computer program" is used herein in a generic sense to reference any type of computer code (e.g., software or microcode) that can be employed to program one or more processors to implement above-discussed aspects of the present invention.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A system for guiding an articulated vehicle having at least a first section and a second section connected at a first articulation point, the system comprising:
   at least a first sensor positioned separately from the vehicle having a field of view to include the vehicle in a current position and a target position and configured to detect at least the position and a relative angle of the first and second sections and generate therefrom sensor information;
   a computing system configured to receive the sensor information from the at least first sensor and to process the sensor information for a pose-determining algorithm to determine current pose information of the vehicle, the computing system being configured to determine a target pose and a target trajectory by which the vehicle can move from the current pose to the target pose, and further to process the current pose information for a guidance-determining algorithm to determine a guidance command for the vehicle to guide the vehicle on the target trajectory; and
   a communication device configured to transmit the guidance command to the vehicle, wherein the computing system is positioned separately from the vehicle and the communication device comprises a wireless transmitter positioned separately from the vehicle and configured to communicate with a wireless receiver on the vehicle.

2. The system of claim 1, further comprising a second sensor positioned separately from the vehicle and configured to detect at least one of the position and relative angle of the first and second sections.

3. The system of claim 2, wherein the first sensor is positioned in a first location, the second sensor is positioned in a second location, and the first location is different from the second location.

4. The system of claim 1, further comprising a second sensor positioned on the vehicle, the second sensor being configured to detect at least one of a position and a relative angle of the first and second sections.

5. The system of claim 1, wherein the first sensor comprises at least one of a camera, a LiDAR unit, an ultrasonic sensor, an infrared proximity sensor, a radar, and a RFID sensor.

6. The system of claim 1, wherein the vehicle further comprises a third section connected to the second section at a second articulation point and wherein the first sensor is configured to detect at least one of a position and relative angle of the third section.

7. The system of claim 1, wherein the guidance command includes a desired steering angle and a velocity command for the vehicle.

8. A method of guiding an articulated vehicle having at least a first section and a second section connected at an articulation point, the method comprising:
   sensing at least one of a position and a relative angle of the first and second sections with at least a first sensor positioned separately from the vehicle;
   transmitting the at least one of the position and the relative angle of the first and second sections to a computing system positioned separately from the vehicle;
   determining a current pose of the vehicle from the at least one of the position and the relative angle;
   determining a target pose and a target trajectory;
   determining guidance commands for the vehicle to move from the current pose on the target trajectory; and
   communicating the guidance commands to a wireless receiver on the vehicle via a wireless transmitter.

9. The method of claim 8, wherein determining the current pose of the vehicle comprises determining the orientation of the first and second sections.

10. The method of claim 8, wherein determining guidance commands for the vehicle comprises determining at least one of a steering angle for the vehicle and a velocity command for the vehicle.

11. The method of claim 8, further comprising guiding the vehicle to the target pose based on the guidance commands.

* * * * *